(12) United States Patent
De Carné-Carnavalet et al.

(10) Patent No.: US 11,815,028 B2
(45) Date of Patent: Nov. 14, 2023

(54) TURBINE ENGINE FOR AN AIRCRAFT

(71) Applicant: SAFRAN AIRCRAFT ENGINES, Paris (FR)

(72) Inventors: Vincent Marie Jacques Rémi De Carné-Carnavalet, Moissy-Cramayel (FR); Guillaume Jean Pierre Lahaye, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/843,164

(22) Filed: Apr. 8, 2020

(65) Prior Publication Data
US 2020/0325828 A1  Oct. 15, 2020

(30) Foreign Application Priority Data

Apr. 9, 2019  (FR) ...................................... 1903798

(51) Int. Cl.
*F02C 7/32* (2006.01)
*B64D 27/10* (2006.01)
*B64D 33/08* (2006.01)

(52) U.S. Cl.
CPC ................ *F02C 7/32* (2013.01); *B64D 27/10* (2013.01); *B64D 33/08* (2013.01); *F05D 2220/323* (2013.01); *F05D 2260/606* (2013.01)

(58) Field of Classification Search
CPC .... B64D 2013/0603; B64D 2013/0622; F02C 7/18; F02C 7/185; F02C 7/042; F02C 6/08; F01D 11/24
See application file for complete search history.

(56) References Cited

U.S. PATENT DOCUMENTS

| | | | | |
|---|---|---|---|---|
| 3,638,428 A | * | 2/1972 | Shipley | F04D 27/0215 60/226.1 |
| 4,086,761 A | * | 5/1978 | Schaut | F04D 27/023 60/262 |
| 4,679,982 A | * | 7/1987 | Bouiller | F04D 27/023 251/358 |
| 5,012,639 A | * | 5/1991 | Ream | F02C 7/14 60/226.1 |

(Continued)

FOREIGN PATENT DOCUMENTS

| | | |
|---|---|---|
| EP | 0469825 A2 | 2/1992 |
| EP | 0743434 A1 | 11/1996 |

(Continued)

OTHER PUBLICATIONS

Rapport De Recherche Preliminaire dated Dec. 19, 2019, for French Application No. 1903798, filed Apr. 9, 2019, 2 pages.

*Primary Examiner* — Thuyhang N Nguyen
(74) *Attorney, Agent, or Firm* — Christensen O'Connor Johnson Kindness PLLC

(57) ABSTRACT

Turbines for an aircraft include a supply device of compressed air configured to supply compressed air to the aircraft, a cooling system of the compressed air supplied to the aircraft, having a scoop configured to collect cooling air in a flow duct of a secondary flow, and a management system configured to be supplied with the cooling air collected from the flow duct and configured to control radial clearances between a turbine casing and turbine rotor vanes tips. The management system is supplied with cooling air by the scoop of the cooling system.

10 Claims, 1 Drawing Sheet

(56) References Cited

U.S. PATENT DOCUMENTS

| | | | | |
|---|---|---|---|---|
| 5,729,969 A | * | 3/1998 | Porte | F02C 7/185 |
| | | | | 60/782 |
| 7,886,520 B2 | * | 2/2011 | Stretton | F01D 17/105 |
| | | | | 239/265.17 |
| 8,678,760 B2 | * | 3/2014 | Clemen | F01D 5/14 |
| | | | | 415/209.1 |
| 9,624,831 B2 | * | 4/2017 | Brousseau | F02C 7/00 |
| 9,810,147 B2 | * | 11/2017 | Tretow | B64D 13/06 |
| 9,835,092 B2 | * | 12/2017 | Sawyers-Abbott | F02C 7/18 |
| 2013/0019609 A1 | * | 1/2013 | Wong | F01D 25/162 |
| | | | | 60/797 |
| 2015/0052907 A1 | * | 2/2015 | Murphy | F02C 7/185 |
| | | | | 60/783 |
| 2016/0281539 A1 | * | 9/2016 | Linde | F02K 1/766 |

FOREIGN PATENT DOCUMENTS

| | | | | | |
|---|---|---|---|---|---|
| EP | 2236772 A2 | | 10/2010 | | |
| FR | 3057615 A1 | | 4/2018 | | |
| GB | 2566207 A | * | 3/2019 | ............ | F01D 17/10 |
| WO | WO-2017220881 A1 | * | 12/2017 | ............ | F01D 17/10 |

\* cited by examiner

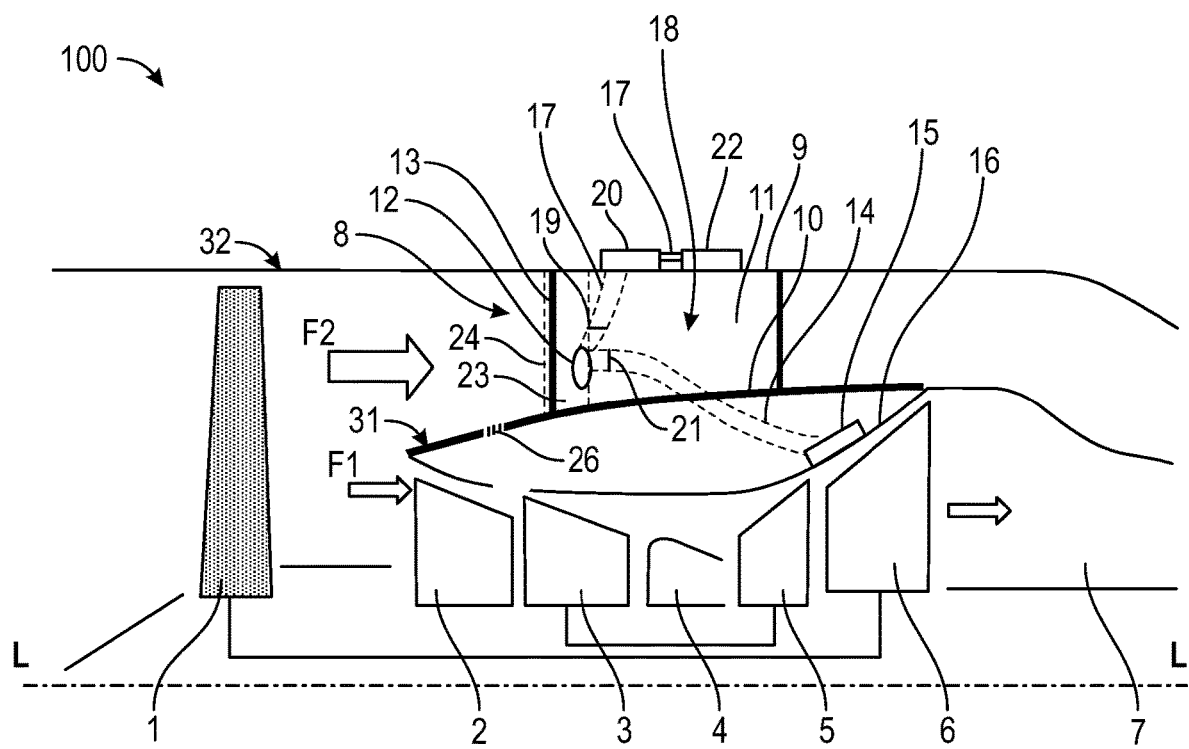

TURBINE ENGINE FOR AN AIRCRAFT

CROSS REFERENCE TO RELATED APPLICATION

This application claims priority under 35 U.S.C. § 119 to French Patent Application No. 1903798, filed Apr. 9, 2019, which is herein incorporated by reference in its entirety.

FIELD

Embodiments of the present disclosure relate to the field of aeronautics, for example, a turbine engine for an aircraft.

BACKGROUND

The prior art includes EP-A2-0 469 825, FR-A1-3 057 615, EP-A1-0 743 434 and EP-A2-2 236 772.

A turbine engine for an aircraft generally comprises, upstream to downstream in the direction of the flow of the gases, one or more fans, then an engine portion comprising one or more compressor stages, for example a low-pressure, LP, compressor, and a high-pressure, HP, compressor, a combustion chamber, one or more turbine stages, for example a high-pressure HP turbine, and a low-pressure LP turbine, and a gas exhaust nozzle. A turbine can correspond to each compressor, the two being connected by a shaft, thus forming, for example, a high-pressure HP body, and a low-pressure LP body.

The compressors comprise rotors comprising vanes configured respectively to compress air before the introduction thereof into the combustion chamber. Likewise, the rotors of the turbines comprise vanes configured to be driven by the combustion gases produced by the combustion chamber in order to rotate the rotors. All the rotors are rotationally mounted in annular casings which are assembled axially in succession so as to form an overall primary flow casing of the turbine engine.

The air flow passing around this overall primary flow casing, i.e. around the engine portion of the turbine engine, is termed secondary flow and is guided by a secondary flow duct.

Collecting air from the turbine engine, for example in the secondary flow duct, in order to supply systems of the aircraft, cools the air travelling from a compressor of the turbine engine to the aircraft, and systems of the turbine engine, to cool the turbine annular casing to manage the clearances between this casing and a turbine rotor.

In order to recover these air flows at the correct pressure, scoops are installed in the secondary flow duct. These scoops can be flush, e.g., they consist of a single opening at the surface of the secondary flow duct, or dynamic, e.g., they are intrusive in the flow of the secondary flow duct, with a cover system to recover the air dynamics. These scoops are equipped with valves which make it possible to adjust the air flow for the corresponding system, even to cut off the flow completely.

From an aerodynamic standpoint, the ideal situation is to have a secondary flow duct that is as smooth as possible. Yet, these scoops, whether they are flush or dynamic, flowing or closed, are sources of total pressure losses in the secondary flow duct, which directly result in an increase in fuel consumption of the engine.

Furthermore, these scoops can be the source of potential pressure increases of the secondary flow duct to the fan, which is a source of aeroelastic vibration, of noise pollution, and causes a decrease in the average efficiency of the fan, as well as a reduction of the surge margin.

Also, without this resulting in an interaction between a static pressure distortion and the fan, these scoops can be at the origin of additional noise pollution by resonance of the cavity formed by the scoop. This problem mainly appears when the need to cool the system of the aircraft or of the propulsion unit is no longer needed and the scoop is therefore closed.

Finally, the multiplication of the scoop and of the associated conduits increases the integration difficulty, as well as the number of parts to be manufactured and to be mounted on the engine. There is therefore a weight impact and an impact on production costs associated with optimizing these different systems.

Embodiments of the present disclosure resolve all or some of the abovementioned problems.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present disclosure proposes, to this end, a turbine engine (e.g., for an aircraft), comprising a supply device of compressed air configured to supply compressed air to the aircraft, a cooling system of the compressed air supplied to the aircraft, this cooling system comprising a scoop configured to collect cooling air in a flow duct of a secondary flow and a management system of the diameter of a turbine casing, this system being supplied with air collected from the duct and being configured to control the radial clearances between this casing and turbine rotor vanes tips. According to the present disclosure, the management system is supplied with air by the scoop of the cooling system.

Thus, the present disclosure makes it possible to reduce the number of scoops by proposing a single scoop to satisfy the needs of several systems, in particular a cooling system and a management system. The present disclosure thus makes it possible to reduce the overall intrusion of the scoops in the secondary flow duct. This therefore reduces the disturbance of the flow in the secondary flow duct.

Furthermore, the single scoop is configured to be always flowing, either for the system of the aircraft or for the system of the turbine engine, which limits the acoustic resonance problems of the scoop occurring when the scoop is closed.

An optimization of the shape of this single scoop would make it possible also to supply the systems with an increased performance (potentially enabling the latter to be better sized to achieve the same function).

The turbine engine according to the present disclosure can comprise one or more of the features below, taken individually from one another or in combination with one another:

the scoop is located on a tubular arm for the passage of auxiliaries of an intermediate casing, the arm is located downstream from an annular row of rectifiers of the secondary flow, these rectifiers being located downstream from a fan, leading edges of the rectifiers and a leading edge of the arm are substantially located in the same plane perpendicular to a longitudinal axis of the turbine engine, the scoop is located at a junction between the arm and an inner annular wall defining an inner face of the duct, the inner annular wall comprises at least one outlet grille for the discharge air of a compressor, the at least one grille is located upstream from the scoop relative to the secondary flow, the scoop is connected by a bypass to two supply channels of the management system and of the cooling system respectively, this bypass being located in the arm.

The present disclosure also relates to a propulsion unit comprising a turbine engine such as described above, as well as a nacelle, the supply device being located in this nacelle.

DESCRIPTION OF THE DRAWINGS

The present disclosure will be better understood, and other details, features and advantages of the present disclosure will appear more clearly upon reading the following description provided as a non-limiting example and with reference to the appended drawing, wherein:

The FIGURE is a longitudinal, cross-sectional, partial, schematic view of a turbine engine according to an embodiment of the present disclosure.

DETAILED DESCRIPTION

With reference to the FIGURE, a representative and non-limiting dual flow turbine engine 100 generally comprises, upstream to downstream, in the direction of the gas flow, one or more fans 1, then an engine portion comprising one or more low-pressure 2 then high-pressure 3 compressor stages, a combustion chamber 4, one or more high-pressure 5 then low-pressure 6 turbine stages, and an exhaust nozzle 7 of primary gases. Rotors, rotating about the longitudinal axis LL of the turbine engine and able to be coupled together by different transmission systems and gears, correspond to these different elements. The compressor rotors are rotationally mounted in annular compressor casings. In the same way, the turbine rotors are rotationally mounted in annular turbine casings 16. The compressor and turbine casings are assembled axially in succession so as to form an overall casing.

Here, the air flow driven by the fans is separated in a primary flow portion F1 entering into the primary circuit corresponding to the engine portion, i.e., inside the overall casing, and a secondary flow portion F2 (hereinafter, "secondary flow"), significantly contributing to the thrust provided by the turbine engine. The secondary flow F2 passes around the engine portion in a flow duct 8 of the secondary flow F2. The duct 8 comprises two annular walls 31, 32 that are coaxial with respect to the longitudinal axis LL, respectively an inner annular wall 31 and an outer annular wall 32.

Generally, a turbine engine is equipped with at least one system 18 configured for the passage of auxiliaries such as air conduits, oil conduits, electric cables, etc., such that they can pass through a duct such as the flow duct 8 of the secondary flow F2, by minimizing the disturbances of this flow.

The auxiliaries make it possible to connect a first equipment located radially inside the duct to a second equipment located radially outside of the duct (the expression radially being used with respect to the longitudinal axis LL of the turbine engine).

The system 18 is configured for the passage of auxiliaries, represented in the FIGURE in the duct 8, generally comprises an intermediate casing having two annular and coaxial shells, respectively an inner shell 10 and an outer shell 9.

These two shells 9, 10, are connected by at least one substantially radial and tubular arm 11, which comprises inner housings configured for the passage of auxiliaries. The shells 9, 10 form the continuity of the inner annular wall 31 and outer 32 annular wall of the duct 8 at the level of the system 18 configured for the passage of auxiliaries.

Generally, the arm(s) 11 of the system 18 configured for the passage of auxiliaries are profiled and aligned in the direction of the main flow of the air flow in the duct 8 to limit the disturbance of this flow and to decrease pressure drops. The arm 11 here comprises a leading edge 13, by which the secondary flow F2 is configured to enter into contact with the arm 11 and which is therefore profiled to limit the disturbance caused by the secondary flow F2.

The turbine engine 100 further comprises a supply device 22 of compressed air configured to supply compressed air to the aircraft.

The turbine engine 100 also comprises a cooling system 20 configured to cool the compressed air supplied to the aircraft by the supply device 22. The cooling system 20 comprises a scoop 12 configured to collect cooling air in the flow duct 8 of the secondary flow F2. The cooling system 20 here comprises a supply channel 17, enabling conveyance of the air collected by the scoop 12 to the supply device 22.

The turbine engine 100 further comprises a management system 15 of the diameter of the turbine engine casing 16, in particular of the low-pressure turbine 6, configured to control the radial clearances between this casing 16 and vanes tips of the turbine rotors, for example by cooling the casing 16.

According to the present disclosure, the management system 15 is supplied with (and is configured to be supplied with) air by the scoop 12 of the cooling system 20. The management system 15 here comprises a supply channel 14 enabling conveyance of the air collected by the scoop 12, to the turbine casing 16.

Thus, the present disclosure enables use a single scoop 12 that supplies both the cooling system 20 and the management system 15 with cooling air. That is, in some embodiments, the scoop 12 is the only such scoop of the cooling system 20.

The two respective supply channels 14, 17 of the management system 15 and of the cooling system 20 form a bypass which, in the non-limiting embodiment of the FIGURE, is located in the arm 11. The scoop 12 is located in the arm 11 such that the bypass is connected to the scoop 12 inside the arm 11.

The supply channel 14 thus passes into the arm 11 and passes through the shell 10 to bring the cooling air, collected from the secondary flow F2, to the management system 15, in order to adjust the clearance between the turbine casing 16 and the vanes of the turbine rotors. In the same way, the supply channel 17 passes into the arm 11 and passes through the shell 9, so as to supply the compressed air supply device 22 with cooling air.

The action of positioning the scoop 12 and the bypass in the arm 11 makes it possible to free up space in the engine portion of the turbine engine, which is particularly advantageous, given the fact that the engine portion is very bulky.

The scoop 12 can be flush, e.g., it consists of a single opening at the surface of the duct 8, or dynamic, e.g., it is intrusive in the flow of the duct 8, with a cover system to recover the air dynamics. In any case, the scoop is equipped with one or more valves which enable adjustment of the air flow for the corresponding system, even to cut off the flow completely.

In the example illustrated, the scoop 12 comprises a first valve 19 located at the level of an inlet of the supply channel 17 and enabling adjustment of the air flow collected by the scoop 12 and conveyed by the cooling system 20. In this example, the scoop 12 comprises a second valve 21 located at the level of an inlet of the supply channel 14 and enabling adjustment of the air flow collected by the scoop 12 and conveyed by the management system 15.

In another embodiment, the turbine engine comprises a single regulation valve, configured to both adjust the flow of the supply channel 14 and the flow of the supply channel 17.

The scoop 12 is, for example, located in the proximity of the leading edge 13 of the arm 11, for example at a junction between the arm 11 and the inner annular wall 31 defining an inner face of the duct.

The turbine engine 100 further comprises an annular row of rectifiers 23 (represented as a dotted line in the FIGURE) of the secondary flow F2.

The rectifiers 23 comprise leading edges 24, which are in this non-limiting case located along with the leading edge 13 of the arm 11, in the same plane perpendicular to the longitudinal axis LL of the turbine engine, which is the plane of the drawing of the FIGURE.

The inner annular wall 31 comprises at least one discharge air outlet grille 26 of the compressor(s) 2, 3. The grille 26 is located upstream from the scoop 12 relative to the secondary flow F2.

The detailed description set forth above in connection with the appended drawings, where like numerals reference like elements, are intended as a description of various embodiments of the present disclosure and are not intended to represent the only embodiments. Each embodiment described in this disclosure is provided as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result. Generally, the embodiments disclosed herein are non-limiting, and the inventors contemplate that other embodiments within the scope of this disclosure may include structures and functionalities from more than one specific embodiment shown in the figures and described in the specification. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed. For example, the present disclosure includes additional embodiments having combinations of any one or more features described above with respect to the representative embodiments.

In the foregoing description, specific details are set forth to provide a thorough understanding of exemplary embodiments of the present disclosure. It will be apparent to one skilled in the art, however, that the embodiments disclosed herein may be practiced without embodying all the specific details. In some instances, well-known process steps have not been described in detail in order not to unnecessarily obscure various aspects of the present disclosure.

The present application may include references to directions, such as "first," "second," "vertical," "horizontal," "front," "rear," "left," "right," "top," and "bottom," etc. These references, and other similar references in the present application, are intended to assist in helping describe and understand the particular embodiment (such as when the embodiment is positioned for use) and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The term "about," "approximately," etc., means plus or minus 5% of the stated value. The term "based upon" means "based at least partially upon."

The embodiments of the invention in which an exclusive property or privilege is claimed are defined as follows:

1. A turbine engine for an aircraft, comprising:
   a supply device of compressed air configured to supply compressed air to the aircraft;
   a cooling system of the compressed air supplied to the aircraft, comprising a scoop configured to collect cooling air in a flow duct of a secondary flow; and
   a management system of a diameter of a turbine casing, configured to be supplied with the cooling air collected from the scoop of the cooling system, and configured to control radial clearances between the turbine casing and a plurality of turbine rotor vanes tips,
   wherein the scoop is located on a tubular arm configured for the passage of a plurality of auxiliaries of an intermediate casing, the tubular arm extending radially between an inner radial end fixed to an inner shell of the intermediate casing and an outer radial end fixed to an outer shell of the intermediate casing, the inner and outer shells of the intermediate casing defining a portion of the flow duct of the secondary flow, the scoop being located at a junction between the tubular arm and an inner annular wall defining an inner face of the flow duct,
   wherein the scoop is connected by a bypass to a first supply channel of the management system and a second supply channel of the cooling system, the bypass being located in the tubular arm, wherein the first supply channel passes into the tubular arm and through the inner shell and the second supply channel passes into the tubular arm and through the outer shell;
   wherein the scoop includes an opening in direct contact with the secondary flow, the first supply channel and the second supply channel are separate channels that only intersect at the junction at the opening, such that the first and the second supply channels are in direct contact with the secondary flow.

2. The turbine engine according to claim 1, wherein the tubular arm is located downstream from an annular row of rectifiers of the secondary flow, the rectifiers being located downstream from a fan.

3. The turbine engine according to claim 2, wherein leading edges of the rectifiers and a leading edge of the tubular arm are located in a same plane perpendicular to a longitudinal axis of the turbine engine.

4. The turbine engine according to claim 1, wherein the inner annular wall comprises at least one discharge air outlet grille of a compressor.

5. The turbine engine according to claim 4, wherein the at least one discharge air outlet grille is located upstream from the scoop relative to the secondary flow.

6. The turbine engine according to claim 1, wherein the scoop is the only scoop of the cooling system.

7. The turbine engine of claim 1, wherein the scoop comprises a first valve located at an inlet of the second supply channel and a second valve located at an inlet of the first supply channel.

8. The turbine engine of claim 1, wherein the scoop comprises a single vane arranged to adjust the flow of the first supply channel and the second supply channel.

9. The turbine engine of claim 1, wherein the tubular arm comprises an upstream wall and a downstream wall extending radially between the inner radial end and the outer radial end, the tubular arm further comprising internal channels for the passage of the auxiliaries.

10. A turbine engine for an aircraft, comprising:
- a cooling system of compressed air which is supplied to the aircraft, comprising a scoop which collects cooling air in a flow duct of a secondary flow; and
- a management system of a diameter of a turbine casing which controls radial clearances between the turbine casing and a plurality of turbine rotor vanes tips, the management system being supplied with the cooling air collected from the scoop of the cooling system,
- wherein the scoop is located on a tubular arm configured for the passage of a plurality of auxiliaries of an intermediate casing, the tubular arm extending radially between an inner radial end fixed to an inner shell of the intermediate casing and an outer radial end fixed to an outer shell of the intermediate casing, the inner and outer shells of the intermediate casing defining a portion of the flow duct of the secondary flow, the scoop being located at a junction between the tubular arm and an inner annular wall defining an inner face of the flow duct,
- wherein the scoop is connected by a bypass to a first supply channel of the management system and a second supply channel of the cooling system, the bypass being located in the tubular arm, wherein the first supply channel passes into the tubular arm and through the inner shell and wherein the second supply channel passes into the tubular arm and through the outer shell;
- wherein the scoop includes an opening in direct contact with the secondary flow, the first supply channel and the second supply channel are separate channels that only intersect the junction at the opening, such that the first and the second supply channels are in direct contact with the secondary flow.

* * * * *